Patented Mar. 6, 1934

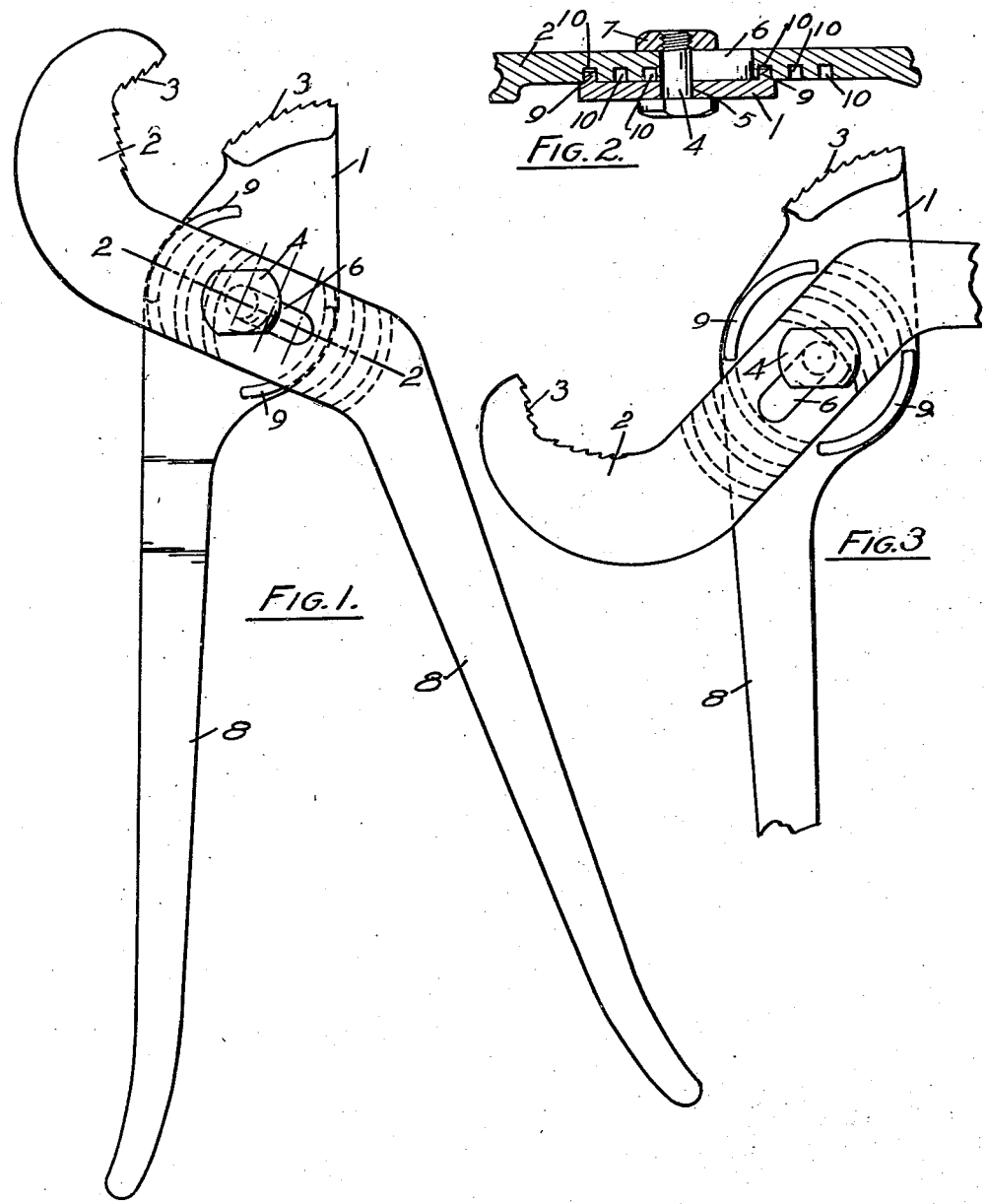

1,950,362

UNITED STATES PATENT OFFICE 1,950,362

TOOL

Howard H. Manning, Meadville, Pa., assignor to Champion De Arment Tool Company, Meadville, Pa., a corporation of Pennsylvania Application February 3, 1932, Serial No. 591,496

11 Claims. (Cl. 81—51.3)

With many tools the members pivotally connected together are provided with work-engaging surfaces and operating handles. A plier is an example of such a tool and the present invention is exemplified as a plier. These tools are usually pivoted together by means of a pin, or bolt and this pin, or bolt, is often put under very severe strain in the operation of the tool. One of the features of this invention is to take the strain off this pivotal bolt by providing an arcuate tongue and groove connection between the members. This takes the radial strain relatively to the pivot. The only strain on the bolt is that necessary to lock the members together. In the preferred embodiment of the invention a plurality of arcuate tongue and groove connections are provided and one of the members is slotted so that the members may be adjusted at the pivot. Features and details of the invention will appear from the specification and claims.

A preferred embodiment of the invention is illustrated in the accompanying drawing as follows:—

Fig. 1 shows an elevation of the pliers in position for use.

Fig. 2 a section on the line 2—2 in Fig. 1.

Fig. 3 an elevation of the pliers with the members swung to inoperative position so as to permit of adjusting the members at the pivot.

The members have jaws 1 and 2. These are provided with gripping surfaces 3. A bolt 4 extends through openings 5 and 6 in the members, one of these openings 6 being in the form of a slot. The bolt 4 is provided with a nut 7.

Handles 8 are provided for the members. One of the members is provided with an arcuate rib, or tongue 9. This tongue is preferably broken through a part of the circumference forming two segments, the opening between the segments being equal at least to the width of the opposing member at the pivot. The opposing member has a series of arcuate grooves 10. Each pair of these grooves is spaced to receive the arcuate tongues. Each pair of grooves has a different center so that as the tongues are placed in different pairs of grooves the members are adjusted relatively to each other at the pivot and the arcs at each adjustment are from radii of equal dimension. In the exemplification shown there are three grooves. It will be seen, therefore, that there are arcuate connections at each side of the pivot comprising as elements a tongue and groove and that there are a plurality of at least one of these elements, in the exemplification shown, the groove, and while I have shown these connections in pairs at each side of the pivot and prefer the construction with connections at each side of the pivot I do not wish to be limited to this double connection. This permits of an adjustment of the members the length of the slot 6 which is the usual range of adjustment in slip pliers and the intermediate grooves gives an intermediate adjustment. In every case the tongue and groove connection takes the radial strain off the bolt.

In operating the device, the pliers are operated in the usual manner of pliers, the tongue and groove connection controlling the pivot and having ample surface to prevent binding. When it is desired to shift the pivotal connection, the members are swung to the position shown in Fig. 3 and the members may be adjusted in either direction, the tongues entered into a pair of ribs and the members brought to operative position.

What I claim as new is:—

1. In a tool, the combination of a pair of members; work-engaging surfaces on the members; and a pivotal joint between the members including arcuate connections on at least one side of the pivot, the connections comprising tongue and groove elements, one of the members having a plurality of elements, each defining an arc, the arcs being of substantially the same radius and adapted to operate in conjunction with an element on the other member.

2. In a tool, the combination of a pair of members; work-engaging surfaces on the members; a pivotal joint between the members including arcuate connections on at least one side of the pivot, the connections comprising tongue and groove elements, one of the members having a plurality of elements, each defining an arc, the arcs being of substantially the same radius and adapted to operate in conjunction with an element on the other member; and means locking the members together.

3. In a tool, the combination of a pair of members; work-engaging surfaces on the members; and a pivotal joint between the members including arcuate connections on at least one side of the pivot, the connections comprising tongue and groove elements, one member having a plurality of elements on different centers adapted to operate in conjunction with an element on the other member.

4. In a tool, the combination of a pair of members, one of the members having a pivot slot therethrough; work-engaging surfaces on the members; a pivotal joint between the members including arcuate connections on at least one side of the pivot and centered approximately at the axis of the pivot, the connections comprising tongue and groove elements, one of the members having a plurality of elements, each defining an arc, the arcs being of substantially the same radius and adapted to operate in conjunction with an element on the other member; and means locking the members together, comprising a pin extending through said slot, the center line of said slot intersecting said arcuate connection.

5. In a tool, the combination of a pair of members; work-engaging surfaces on the members; a pivotal joint between the members including arcuate connections on at least one side of the pivot and centered approximately at the axis of the pivot, the connections comprising tongue and groove elements, one of the members having a plurality of elements adapted to operate in conjunction with an element on the other member; and means securing the members together at the pivot, said arcuate connections being in the form of segments, each defining an arc, the arcs being of substantially the same radius and permitting a disengagement of the segments with an inoperative position of the members and swinging into engagement as the members are moved to operative position.

6. In a tool, the combination of a pair of members; work-engaging surfaces on the members; and a pivotal joint between the members including arcuate connections at each side of the pivot, each connection comprising tongue and groove elements, one member having a plurality of pairs of elements, each defining an arc, the arcs being of substantially the same radius and with a unit of each pair on each side of the pivot, each pair of elements being adapted to operate with a pair of elements on the other member.

7. In a tool, the combination of a pair of members; work-engaging surfaces on the members; and a pivotal joint between the members including arcuate connections at each side of the pivot, each connection comprising tongue and groove elements, one member having a plurality of pairs of elements, each defining an arc, the arcs being of substantially the same radius and with a unit of each pair on each side of the pivot and each pair of elements having a different center.

8. In a tool, the combination of a pair of members; work-engaging surfaces on the members; a pivotal joint between the members including arcuate connections at each side of the pivot, each connection comprising tongue and groove elements, one member having a plurality of pairs of elements, each defining an arc, the arcs being of substantially the same radius and with a unit of each pair on each side of the pivot, each pair of elements being adapted to operate with a pair of elements on the other member; and means at the pivot locking the members together.

9. In a tool, the combination of a pair of members; work-engaging surfaces on the members; a pivotal joint between the members including arcuate connections at each side of the pivot and centered approximately at the axis of the pivot, each connection comprising tongue and groove elements; and means holding the elements together at the pivot, said arcuate connections being in the form of segments, each defining an arc, the arcs being of substantially the same radius and permitting a disengagement of the segments with an inoperative position of the members and swinging into engagement as the members are moved to operative position.

10. In a tool, the combination of a pair of members; work-engaging surfaces on the members; and a pivotal joint between the members including arcuate connections at each side of the pivot and centered approximately at the axis of the pivot, each connection comprising tongue and groove elements, one member having a plurality of pairs of elements with a unit of each pair on each side of the pivot, each pair of elements being adapted to operate with a pair of elements on the other member, the arcuate connections being in the form of segments, each defining an arc, the arcs being of substantially the same radius and permitting a disengagement of the segments with an inoperative position of the members and swinging into engagement as the members are moved to operative position.

11. In a tool, the combination of a pair of members; work-engaging surfaces on the members; a pivotal joint between the members including arcuate connections at each side of the pivot and centered approximately at the axis of the pivot, each connection comprising tongue and groove elements, one member having a plurality of pairs of elements with a unit of each pair on each side of the pivot, each pair of elements being adapted to operate with a pair of elements on the other member, the arcuate connections being in the form of segments, each defining an arc, the arcs being of substantially the same radius and permitting a disengagement of the segments with an inoperative position of the members and swinging into engagement as the members are moved to operative position; and means at the pivot locking the members together.

HOWARD H. MANNING.